(12) United States Patent
Lee et al.

(10) Patent No.: US 9,188,682 B2
(45) Date of Patent: Nov. 17, 2015

(54) COMPUTED RADIOGRAPHY (CR) SYSTEM

(71) Applicant: 3D IMAGING & SIMULATIONS CORP., Daejeon (KR)

(72) Inventors: Sung Woon Lee, Daejeon (KR); Jung Ho Kim, Daejeon (KR)

(73) Assignee: 3D IMAGING & SIMULATIONS CORP., Daejeon (KR)

(*) Notice: Subject to any disclaimer, the term of this patent is extended or adjusted under 35 U.S.C. 154(b) by 198 days.

(21) Appl. No.: 13/804,399

(22) Filed: Mar. 14, 2013

(65) Prior Publication Data

US 2014/0166886 A1    Jun. 19, 2014

(30) Foreign Application Priority Data

Dec. 17, 2012 (KR) .................. 10-2012-0147743

(51) Int. Cl.
*G01T 1/20* (2006.01)

(52) U.S. Cl.
CPC .................. *G01T 1/2012* (2013.01)

(58) Field of Classification Search
CPC ...................................... G01T 1/2012
See application file for complete search history.

(56) References Cited

U.S. PATENT DOCUMENTS

| 6,385,371 | B1* | 5/2002 | Li ................................. 385/43 |
| 6,717,174 | B2* | 4/2004 | Karellas ....................... 250/582 |
| 2010/0252756 | A1* | 10/2010 | Smitt et al. .................... 250/584 |

* cited by examiner

*Primary Examiner* — David Porta
*Assistant Examiner* — Mindy Vu
(74) *Attorney, Agent, or Firm* — Lex IP Meister, PLLC (57) ABSTRACT

A computed radiography system includes a stimulating light source, a imaging plate (IP), a light collector having a bundle of optical fibers, a light detector, a mechanism providing relative movement in two orthogonal directions between the IP and the stimulating light source while maintaining the perpendicular relationship between the IP and the stimulating light, and a mechanism including an analog to digital converter for converting the collected and detected PLL to a diagnostic readout.

6 Claims, 8 Drawing Sheets

COMPUTED RADIOGRAPHY (CR) SYSTEM

CROSS-REFERENCE TO RELATED APPLICATION

This application claims priority to and the benefit of Korean Patent Application No. 10-2012-0147743 filed in the Korean Intellectual Property Office on Dec. 17, 2012, the entire contents of which are incorporated herein by reference.

BACKGROUND OF THE INVENTION (a) Field of the Invention

This invention relates to a computed radiography (CR) system which employs a light collector such as a bundle of optical fibers. More particularly, this invention relates to a computed radiography (CR) system employing a bundle of optical fibers for collecting and transferring luminescence light, having a linear end and a two-dimensional end in which a plurality of optical fibers are sequentially arranged according to an input order of light.

(b) Description of the Related Art

In recent years, computed radiography (CR) systems have been successful in replacing analog screen/film (SF) in many clinical settings. Such CR systems use photostimulable x-ray storage phosphor plates (for example, $BaFBr:Eu^{2+}$), which are exposed in cassettes and then brought to an automated plate scanner providing with a bundle of optical fibers for collecting and transferring light, to read out the stored image information.

CR systems bring numerous advantages such as electronic transmission and storage, image processing, and computer-aided diagnosis to clinical departments, in a practical and highly affordable way. However, technical progress in the CR field has reached a plateau (perhaps in part because of economic developments at the chemical imaging companies who originally supported the development of the technology), and CR image quality performance has been surpassed by flat-panel based digital radiography (DR) systems.

DR systems, however, are much more expensive than CR, which has limited their clinical acceptance. A single CR reader can support multiple cassettes and replacing the SF cassettes with CR cassettes can retrofit an entire radiology department. Each individual detector in a room requires a separate DR detector. Furthermore, the replacement cost for a worn out or broken DR detector can be ten to one hundred times more expensive than replacing a CR cassette.

The image quality performance of CR has been limited in the past by two factors: (1) Because of limitations in screen conversion gain, collection efficiency, and detection efficiency, in a CR system that is not optimally designed, the number of detected electrons per absorbed x-ray ("gain") can become low enough to become a secondary quantum sink, (2) CR systems have been observed to have rather high gain fluctuation noise, or "Swank noise", compared to high quality SF or DR systems, where "the Swank noise" can degrade DQE performance and is quantified by the optical Swank factor, which is induced by depth-dependent variations in optical gain.

The above information disclosed in this Background section is only for enhancement of understanding of the background of the invention and therefore it may contain information that does not form the prior art that is already known in this country to a person of ordinary skill in the art.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a computed radiography (CR) system having advantages of equalizing the number of detected electrons per absorbed x-ray ("gain") at a two-dimensional end of a bundle of optical fibers opposing to a PMT not to become low enough to become a secondary quantum sink and having low gain fluctuation noise, that is, low depth-dependent variations in optical gain to reduce "Swank noise".

An exemplary embodiment of the present invention provides a computed radiography system, comprising a stimulating light source, a imaging plate (IP) positioned such that the stimulating light impinges the IP perpendicularly thereto producing photostimulated luminescence light (PLL) having a wave length different from said stimulating light source, a light collector having a bundle of optical fibers for collecting and transferring PLL emitted from the IP, the bundle providing with a liner end proximate to the IP and a two-dimensional end far away from the IP in which a plurality of optical fibers are arranged according to a constant rule, an optical filter in communication with said light collector for blocking stimulating light waves and passing PLL therethrough, a light detector for receiving PLL from the two-dimensional end of the bundle of the light collector, a mechanism providing relative movement in two orthogonal directions between the IP and the stimulating light source while maintaining the perpendicular relationship between the IP and the stimulating light, and a mechanism including an analog to digital converter for converting the collected and detected PLL to a diagnostic readout.

The computed radiography (CR) system according to an exemplary embodiment of the present invention is characterized by a light collector having a bundle of optical fibers for collecting and transferring PLL emitted from the IP, the bundle providing with a liner end proximate to the IP and a two-dimensional end far away from the IP in which a plurality of optical fibers are arranged according to a constant rule, that is, n+1 th optical fiber is disposed adjacent to nth optical fiber.

Thus, the optical fiber' position relation of between input and output ends of the bundle of optical fibers may not effect on the number of detected electrons per absorbed x-ray ("gain"), so that a secondary quantum sink may not occur and low depth-dependent variations in optical gain may occur to reduce "Swank noise".

Also, the computed radiography (CR) system according to an exemplary embodiment of the present invention may particularly provide a uniform optical spectrum distribution; every pixel has a similar image value so that image values configure a low frequency pattern to solve a high frequency pattern problem of the traditional CR system.

Accordingly, the proposed novel CR system is significant because it removes the above-mentioned image quality limitations at an affordable cost. A CR system based on the plurality of optical fibers arranged in order, along zigzag pattern, provides image quality equal to or better than DR, in particular for the high-resolution application of mammography.

DETAILED DESCRIPTION OF THE EMBODIMENTS

Hereinafter, an exemplary embodiment of the present invention will be described in further detail with the accompanying drawings.

In the drawings, explanatorily irrelevant portions are omitted to clearly describe the present invention, and like reference numerals designate like elements throughout the specification.

Furthermore, in case it is judged that the detailed description of the well-known function or structures relevant to the embodiments may needlessly obscure the gist of the present invention, such a description will be omitted.

Figure 1:
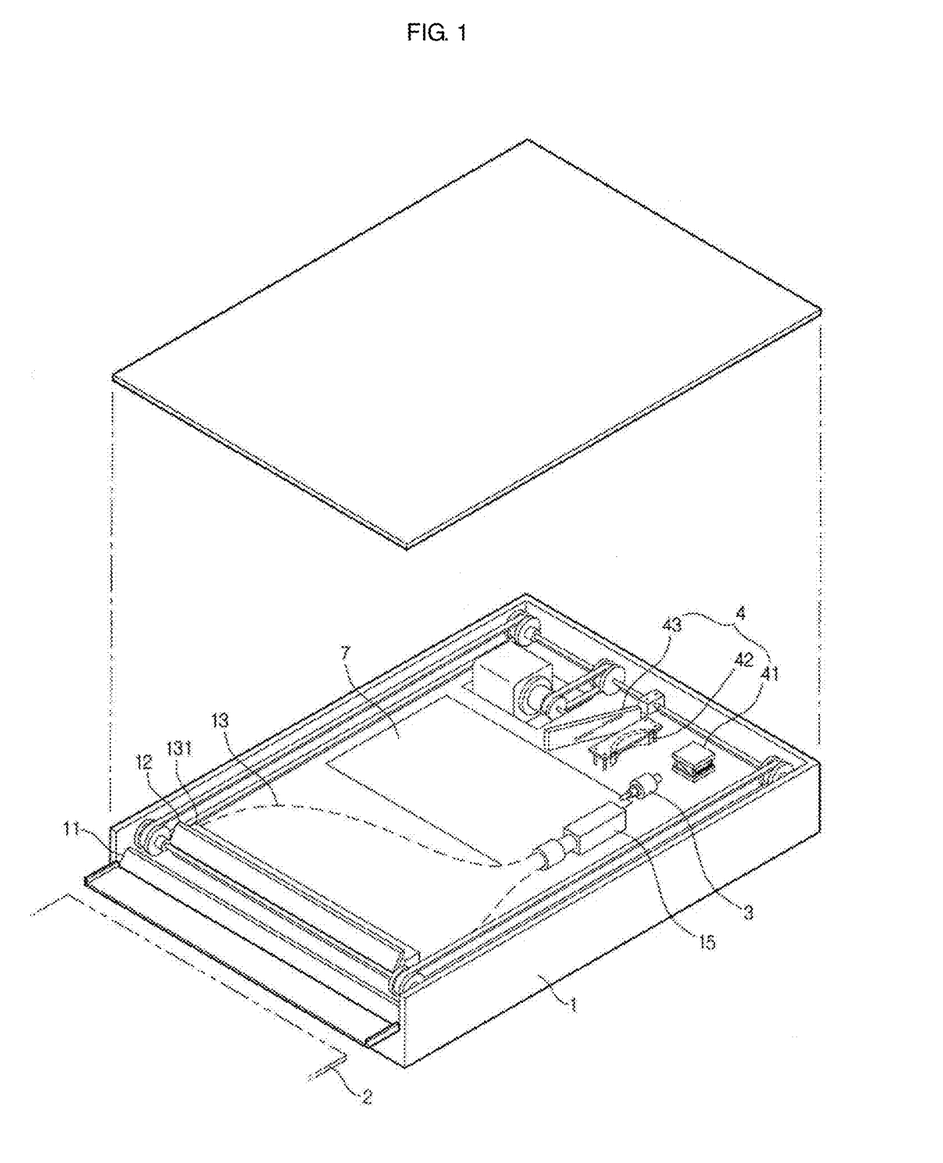
FIG. 1 is a schematic perspective view of an computed radiography (CR) system according to an embodiment of the present invention.
Figure 2:
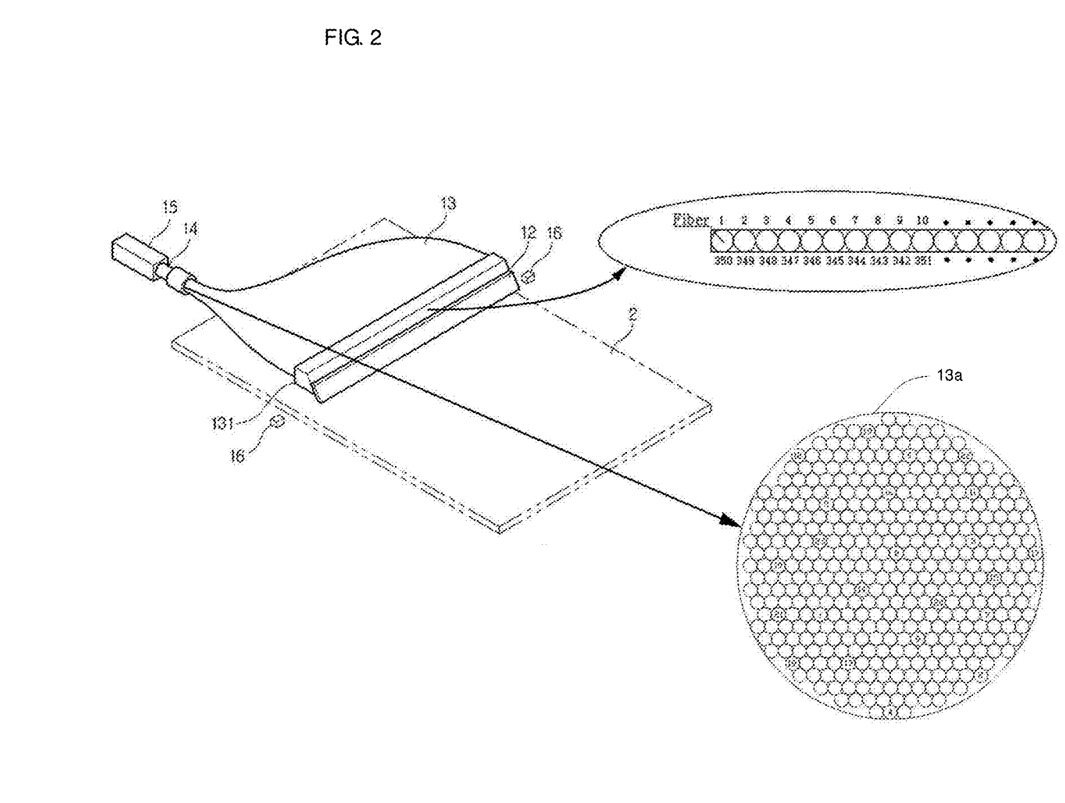
FIG. 2 is a view of main part of the computed radiography (CR) system according to an embodiment of the present invention.
Figure 3A:
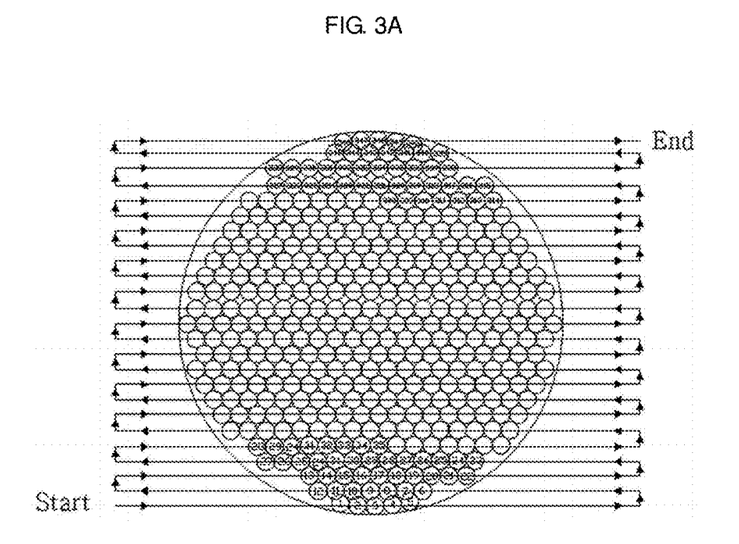
FIG. 3A through FIG. 3C is each view of a two-dimensional end of a bundle of optical fibers far away from the IP in which a plurality of optical fibers are arranged in order according to a zigzag pattern.
Figure 3B:
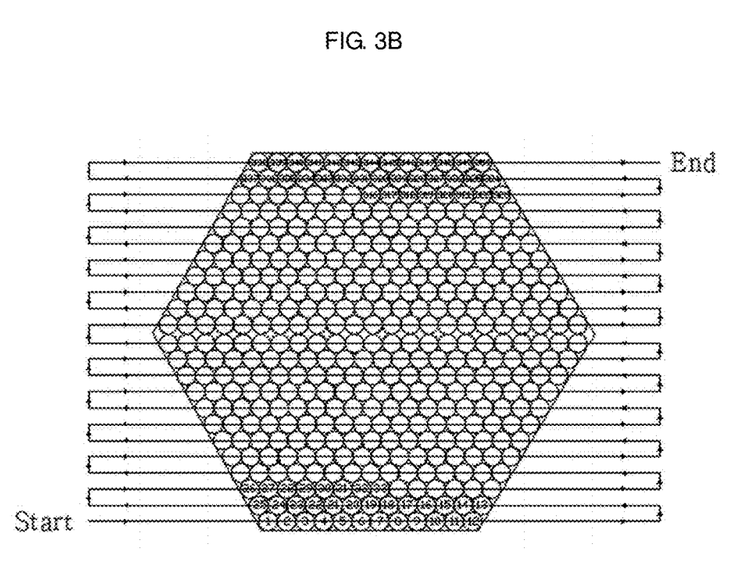
Figure 3C:
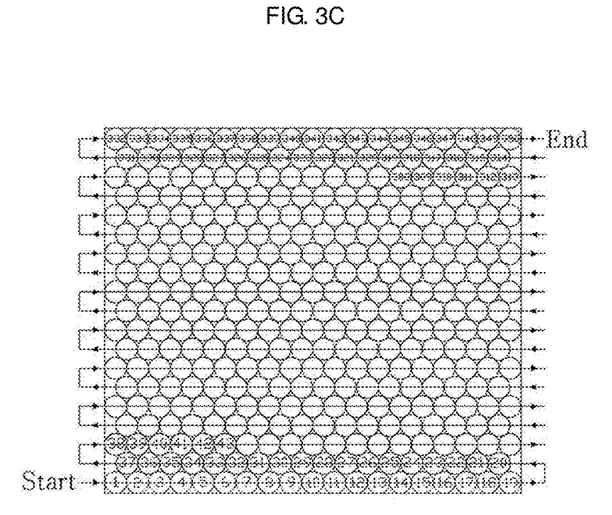

FIG. 1 is a schematic perspective view of an computed radiography (CR) system according to an embodiment of the present invention, FIG. 2 is a view of main part of the computed radiography (CR) system according to an embodiment of the present invention, and FIG. 3A through FIG. 3C is each view of a two-dimensional end of a bundle of optical fibers far away from the IP in which a plurality of optical fibers are arranged in order according to a zigzag pattern.

Referring to FIGS. 1 and 2, the computed radiography (CR) system of the present embodiment, which inserts an imaging plate (IP) 2 into an entrance of a case body 1, scans a laser beam on the IP 2, and acquires an image signal from latent images accumulated by scanning radiation to the IP 2, includes a laser beam scanning unit 4, a reflection mirror 11, a dichroic filter 12, an optical fiber 13, a band pass filter 14, a photo-multiplication tube 15, the position detection sensors 16, the transfer member 5, the power transmission unit 6, and a controller 7.

The apparatus for acquiring an X-ray image apparatus for acquiring the digital X-ray image of the present embodiment is in a cassette way, and is easy for carrying, and thus it is convenient to install the apparatus at any places.

With regard to the characteristics of the IP 2, if the IP 2 is X-ray radiated, a latent image having energy which is in proportion to an X-ray scanning amount exists on the IP 2. If the IP 2 is scanned with a red wavelength laser, the latent image generated by the X-ray radiation is expressed in a blue wavelength. After an image is acquired by scanning the IP 2 with the red laser, the latent image remaining after the IP 2 is scanned is removed in order to reuse the IP 2. Therefore, if the IP 2 is exposed to a strong light, the remaining latent image is removed.

The reflection mirror 11 is installed in the entrance of the case body 1 and has the laser beam scanned by the laser beam scanning unit 4 reflected onto the IP 2 without emitting the laser beam to the outside.

The dichroic filter 12 is fixed to the outer surface of a fixing plate 131 that fixes an optical fiber 13 which is a bundle of fibers, and is installed to have an inclination angle of 45 degrees with respect to light that is input into the optical fiber 13.

The dichroic filter 12 allows a red wavelength light for scanning the IP 2 to reach the IP 2 by transmitting the red wavelength light therethrough, and transfer a blue wavelength light expressed in the IP 2 to the photo-multiplication tube 15 by reflecting the blue wavelength light.

The dichroic filter 12 can produce a substitution effect of the band-pass filter 14 by itself, and can increase an effect of preventing the red wavelength light from being transferred to the photo-multiplication tube 15 when the dichroic filter 12 is used with the band-pass filter 14.

The light collector 13 transfers the blue wavelength light having photostimulated luminescence emitted on the IP 2 to the band-pass filter 14.

The light collector 13 is composed of a bundle of optical fibers 13a and a support body 13b for holding the bundle of optical fibers 13a. The support body 13b has a hole therein which is inserted by the bundle of optical fibers 13a.

The bundle of optical fibers 13a has one end that is uniformly unfolded by the width of the IP 2 and is inputted by the photostimulated luminescence light when a stimulating light source sequentially scans along the width of the IP, and the other end that is fixed as a bunch and is inserted into a light detector 15, for example, the photo-multiplication tube (PMT).

Herein, the other end is fixed as a bunch so that each optical fiber 13aa of the other end may easily be corresponding to a sensor of the light detector, for example, a slit of the PMT15 to increase collection efficiency and detection efficiency.

In order to acquire accurate image information, the photo-multiplication tube 15 must selectively acquire the blue wavelength light that is image information expressed by separating the red wavelength light used to scan the IP 2 and the blue wavelength light expressed on the IP 2. Therefore, the band-pass filter 14 separates wavelengths.

The band-pass filter 14 is installed between the light collector 13 and the photo-multiplication tube 15, transmits the blue wavelength light therethrough and prevents the red wavelength light from transmitting therethrough in order to acquire the blue wavelength light transferred only through the light collector 13.

As shown in FIG. 2, a computed radiography system according to an exemplary embodiment of the present invention includes the bundle providing with a liner end proximate to the IP and a two-dimensional end far away from the IP in which a plurality of optical fibers are arranged according to a constant rule.

Particularly, in order to dispose n+1th optical fiber proximately to nth optical fiber at the output end from which the PLL output as well as the input end into which the PLL input, the hole of the support body 13b has a predetermined two dimensional shape corresponding to a sectional view taken along y-axial direction of the photo-multiplication tube 15 and the plurality of optical fibers 13aa are arranged in order along one direction at nth row and then arranged in order along the opposite direction at n+1th row in the hole such that the output end of the bundle 13a may have the predetermined two dimensional shape.

That is, the plurality of optical fibers 13aa may be arranged in a zigzag pattern along y-axial direction in the predetermined two dimensional shape corresponding to the photo-multiplication tube 15. Likewise, a sub-bundle in which the plurality of optical fibers 13aa is arranged in order may be arranged in a zigzag pattern along y-axial direction in form of the predetermined two dimensional shapes.

The predetermined two dimensional shapes may include circular, square, and hexagon as shown in FIG. 3A through FIG. 3C, thereby minimizing a distance between a last optical fiber of at nth row and a last optical fiber of at n+1th row so as to increase collect efficiency and detection efficiency.

In addition, it is most preferable that the predetermined two dimensional shapes is square as shown FIG. 3B compared to a circular shape as shown FIG. 3B. It is because that the square does not have the distance between a last optical fiber of at nth row and a last optical fiber of at n+1th row is minimized while the circular has more distance between the same owing to a curvature.

The position sensor 16 is located at the both input ends of the case main body 1 and detects where a laser beam scan.

Experimental Example

X-Ray Imaging Performance

In order to compare X-ray Imaging Performance of a computed radiography (CR) system according to an exemplary embodiment of the present invention with the same of the conventional CR system, Detective Quantum Efficiency (DQE) will be considered.

The DQE can be used to identify important factors to measure and to calculate their effect on the signal-to-noise performance of the CR system. We assume a scanning laser spot readout.

The DQE is a measure of the dose efficiency of the detector. It can be calculated using the equation:

$$DQE(f) = \frac{K^2 MTF^2(f)}{NPS(f)Q}$$

where f is the spatial frequency, K is the slope of the characteristic curve, and Q is the x-ray photon fluency incident on the light detector 15, and Noise power spectrum (NPS) characterizes the amount of noise and its texture, will be measured using standard techniques.

The shape of the NPS is important in determining the presence of secondary quantum noise. Secondary quantum noise is caused by having too few optical quanta detected per interacting x ray. If secondary quantum noise exists, then there will be a plateau in the NPS at high spatial frequencies.

In addition, the Swank noise will be considered indirectly from measurements of image noise, input exposure, and quantum detection efficiency as a function of energy. Exposure over an entire area of the IP 2 can be made and read out. For a given exposure, the mean pixel value in the entire I area will be computed. Correcting for small changes in exposure, the standard deviation in the measured mean pixel values is the DC noise component of the detector. It is equal to the square root of the product of the x-ray fluency. Thus, the Swank noise can be estimated by converting the exposure to fluency.

First, noise power spectrum (NPS) for characterizing the amount of noise and its texture, will be measured using standard techniques.

X-ray imaging tests on the IP 2 were performed at the 2-BM beamline of the Advanced Photon Source (Argonne National Laboratory, Argonne, Ill., USA). FIG. 1 shows the experimental setup. A 4 mm (horizontal)×2 mm (vertical) monochromatic x-ray beam was used as an imaging light source.

In the computed radiography (CR) system according an exemplary embodiment of the present invention, the bundle of optical fibers 13a was provided with a liner end proximate to the IP 2 and a two-dimensional end far away from the IP in which a plurality of optical fibers were arranged according to a constant rule.

As comparative Example, in the conventional computed radiography (CR) system computer, the bundle of optical fibers 13a was provided with a two-dimensional end far away from the IP in which a plurality of optical fibers were irregularly arranged.

Hereinafter, the relationships between the operations of the apparatus for acquiring the X-ray image will now be described.

When the laser 3 operates under the control of the controller 7, laser beam generated by the laser 3 is radiated onto the swing mirror 41. The swing mirror 41 which receives the laser beam swings fast left and right, the scanned laser beam is focused through the F-theta lens 42, and is scanned to an entrance side of the IP 2 that is a scanning region by the reflection of the auxiliary mirror 43 through the F-theta lens 42.

The transfer member 5 that receives power of the power transfer unit 6 operates and thus the IP 2 is transferred to the scanning region.

The laser beam scanned to the entrance side of the IP 2 is transmitted through the dichroic filter 12 which is inclined by 45 degrees, and is sent to the optical fiber 13 by reflecting the blue wavelength light of the IP 2.

In addition to the blue wavelength light, an undesired red wavelength light is transferred through the optical fiber 13, and is prevented from transmitting through the band-pass filter 14.

As described above, image scanning of the IP 2 is complete. Meanwhile, when a laser beam swung by the swing mirror 41 is detected by a left sensor, it is recognized as a start of the image scanning, and when the laser beam is detected by a right sensor, it is recognized as an end of the image scanning. Both directions scanning of the IP 2 is continued by the two sensors and thus the IP 2 is entirely scanned.

The controller 7 controls the general operation of the apparatus for acquiring the X-ray image and transmits acquired image information to the PC.

Figure 4A:
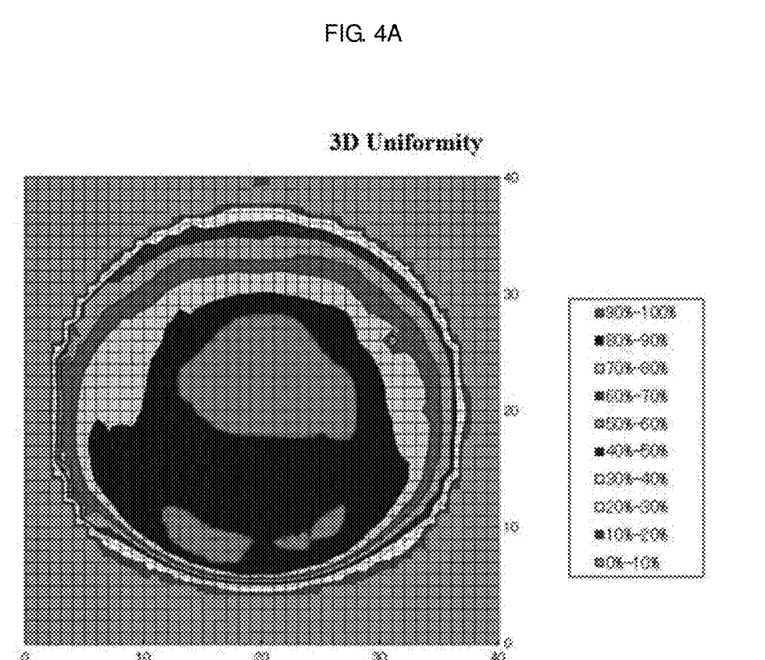
FIG. 4A is an optical spectrum profile of a conventional computed radiography (CR) system having a two-dimensional end of a bundle of optical fibers far away from the IP in which a plurality of optical fibers are arranged irregularly according to a prior art.
Figure 4B:
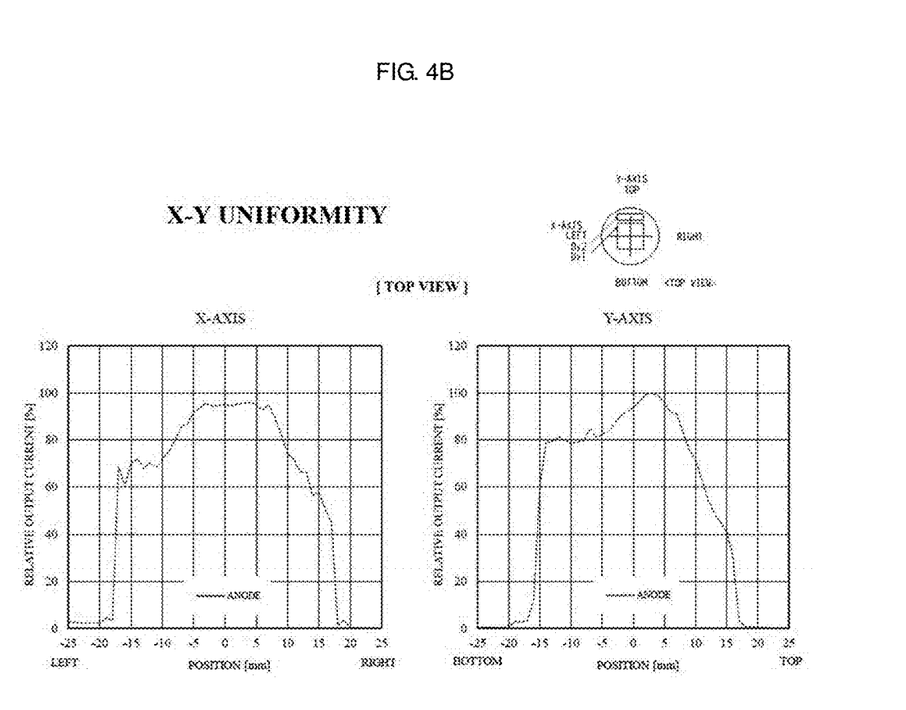
FIG. 4B is a graph showing a relative output current for x-axial direction and y-axial direction of an optical spectrum profile of FIG. 4A.
Figure 4C:
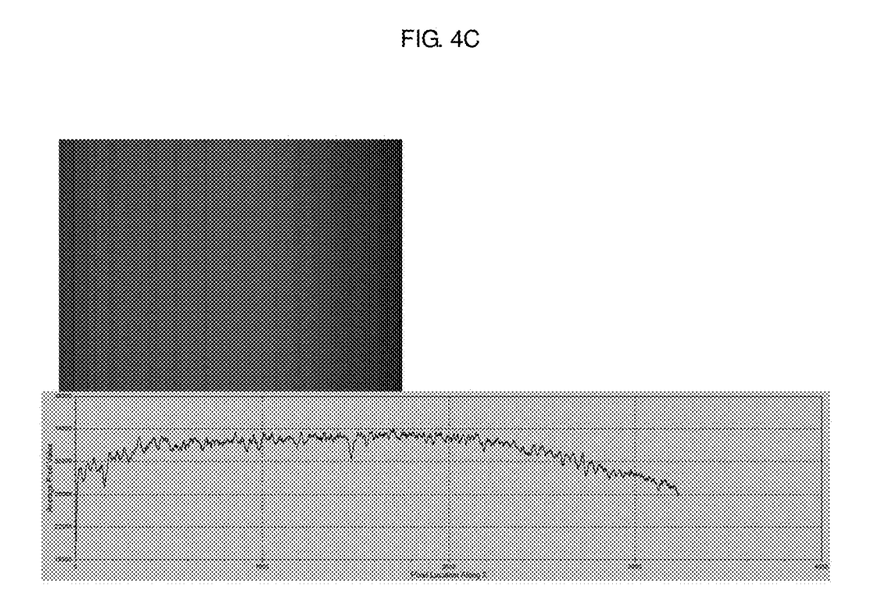
FIG. 4C is a graph showing an average pixel value measured along x-axial direction and a photograph of IP taken by the conventional of a conventional computed radiography (CR) system.
Figure 5:
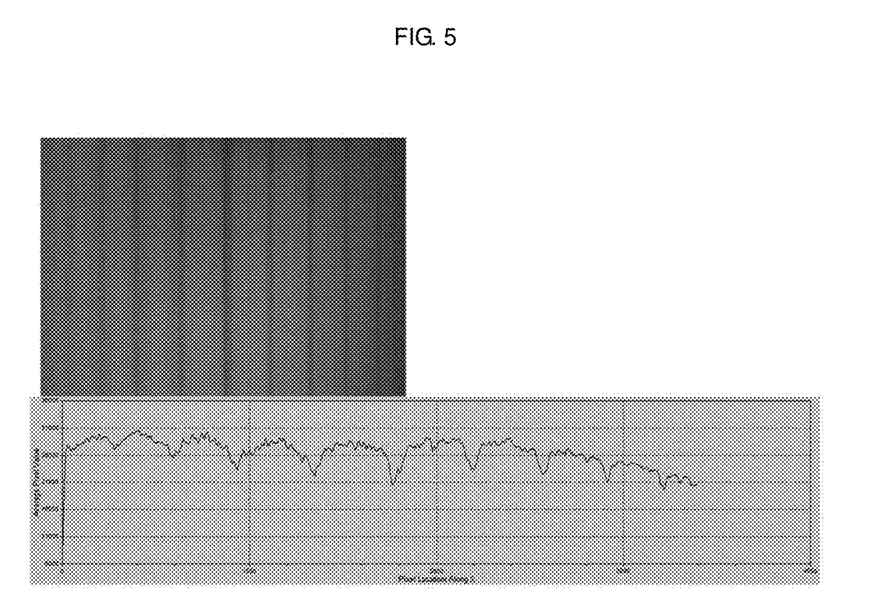
FIG. 5 is a photograph of IP taken according to an embodiment of the present invention.

FIG. 4A is an optical spectrum profile of a conventional computed radiography (CR) system having a two-dimensional end of a bundle of optical fibers far away from the IP in which a plurality of optical fibers are arranged irregularly according to a prior art, FIG. 4B is a graph showing a relative output current for x-axial direction and y-axial direction of an optical spectrum profile of FIG. 4A, and FIG. 4C is a graph showing the mean pixel value measured along x-axial direction and a photograph of IP taken by the conventional of a conventional computed radiography (CR) system, FIG. 5 is a photograph of IP taken according to an embodiment of the present invention.

As shown in FIG. 4A, it will be known that optical spectrum profile of a conventional computed radiography (CR) system has a large deviation at each position where a plurality of optical fibers are arranged irregularly and uniformity of energy distribution is deteriorated.

In addition, as shown in FIG. 4B, it will be known that a difference between the highest current and the lowest current may be about 20 to 30% when a relative output current for x-axial direction and y-axial direction of an optical spectrum profile of FIG. 4A is measured.

It is to be understood that such deviation may be occurred because there is no known relationship between the positions of the ends of the fibers in the entrance field with the positions of the ends of the respective fibers in the exit field.

The light detector 15 may be composed of an optical sensor array, for example, photo-multiplication tube.

A problem which arises when such an optical sensor array is used to sense a pattern of pixels is related to the fact that the photo-multiplication tube does not operate as a true random access array when exposed to light. That is to say, when the photo-multiplication tube is used as a light-sensitive array, it cannot be operated so that a single selected sensor can be exposed, read out, and refreshed for a subsequent cycle without also exposing and refreshing other sensors in the array.

It is more problem when a sub-group of bundle of several optical fibers is corresponding to the one photo-multiplication tube 15 because the optical fiber has a smaller diameter than the photo-multiplication. In addition, in order to acquire a relationship between the positions of the ends of the fibers in the entrance field with the positions of the ends of the respective fibers in the exit field, more position sensor and more time may be required.

Particularly, as shown in FIG. 4C, considering the mean pixel value measured along x-axial direction and a photograph of IP taken by the conventional of a conventional computed radiography (CR) system, it will be known that the mean pixel value is very differently measured each pixel along X-axial direction thereby deteriorating uniformity of each pixel and having high frequency response patterns, and its texture is deteriorated.

In addition, it will be known that calculation error of DQE may be also largely measured because the slope of high frequency response pattern is very large.

Particularly, according to general studies, the conventional computed radiography (CR) system had a deteriorated DQE compared with DR system at high frequency response pattern, that is, at high spatial frequency.

Meanwhile, as shown in FIG. 5, in the computed radiography (CR) system according to an exemplary embodiment of the present invention, considering an variation of the mean pixel value measured along x-axial direction and a photograph of IP, it will be known that the mean pixel value is very similarly measured each pixel along X-axial direction thereby providing an uniformity for each pixel and low frequency response patterns, and its texture is very good (deep valleys of photograph is related to the optical fibers located at edge of the support body 13b).

Accordingly, the prevent invention can solve a problem that the conventional CR system has a bad DQE at a high frequency pattern problem of compared with DR system.

Now, a method for arranging a plurality of optical fibers as a bunch connected to the light detector of the present computed radiography (CR) system will be described in further detail referring to FIG. 6.

Figure 6:
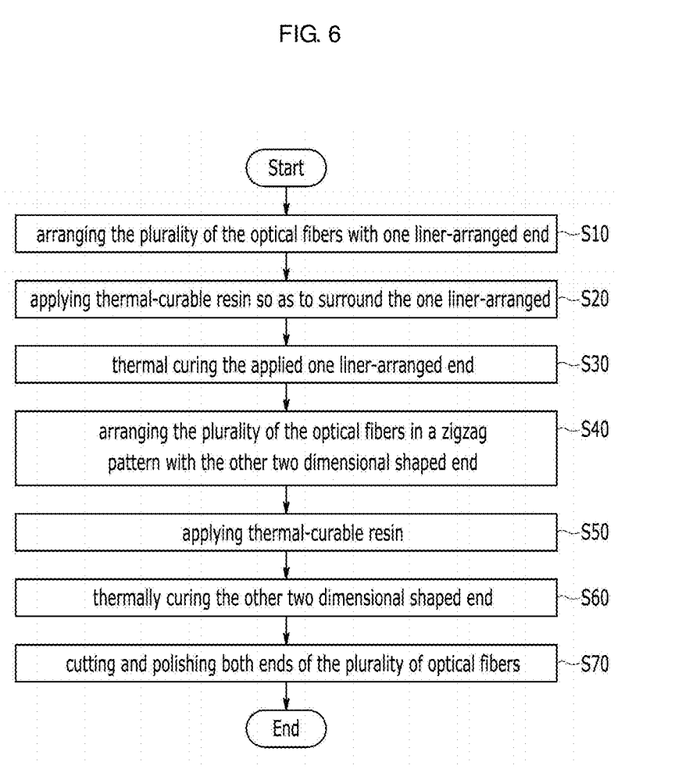
FIG. 6 is a flowchart for representing a method for arranging a plurality of optical fibers in a computed radiography (CR) system according to an exemplary embodiment of the present invention.

FIG. 6 is a flowchart for representing a method for arranging a plurality of optical fibers in a computed radiography (CR) system according to an exemplary embodiment of the present invention.

The method for arranging a plurality of optical fibers as a bunch connected to the light detector of the present computed radiography (CR) system an exemplary embodiment of the present invention may include steps as follows:

First, a plurality of optical fibers of the one input end proximate to the IP 2 is sequentially inserted and arranged into a pair of upper and lower support bodies having a long groove corresponding to a scan width of the IP 2 (S10).

In order to fix the plurality of optical fibers as a bundle 13a having a line end between the pair of upper and lower support bodies, thermal curable resin, for example, epoxy resin may be applied surrounding the plurality of optical fibers into the groove of the same (S20).

The bundle 13a of the optical fibers are hold by a forming jig, moved into a heat chamber, released by the forming jig, and thermally cured so as to have a desired shape corresponding to the support body connected to the light detector 15 (S30).

The plurality of optical fibers of the other existence end far away from the IP 2 are arranged in order along one direction at nth row and then in order along the reverse direction at n+1th row in a hole of a support body connected to the light detector 15 in order to form the other existence end of the bundle 13a in form of a desired two dimensional shape corresponding to the light detector 15. To be sure, the hole may have include circular, square, and hexagon. That is, the plurality of optical fibers is advanced in a zigzag pattern along y-axial direction (S40).

In order to fix the plurality of optical fibers as a bundle 13a having the desired two dimensional end in the hole of the support body, thermal curable resin, for example, epoxy resin may be applied surrounding the plurality of optical fibers into the same (S50).

The bundle 13a of the optical fibers are hold by a forming jig, moved into a heat chamber, released by the forming jig, and thermally cured so as to have a desired shape corresponding to the support body connected to the light detector 15 (S60).

The both input and output ends of the optical fiber bundle 13a are cut by about 0.5 mm from a surface of the support body, polished and then connected to the light detector 15 (S70).

Meanwhile, an alternative method for arranging a plurality of optical fibers as a bunch connected to the light detector of the present computed radiography (CR) system will be described in further detail referring to FIG. 7.

Figure 7:
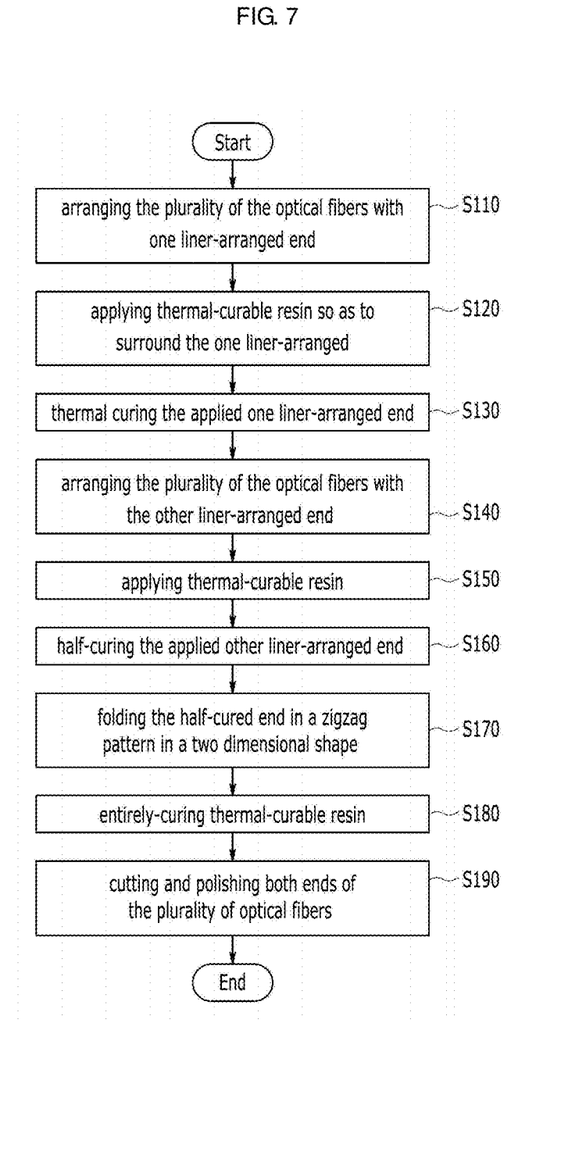
FIG. 7 is a flowchart for representing a method for arranging a plurality of optical fibers of a computed radiography (CR) system according to an alternative exemplary embodiment of the present invention.

FIG. 7 is a flowchart for representing a method for arranging a plurality of optical fibers in a computed radiography (CR) system according to an alternative exemplary embodiment of the present invention.

First, a plurality of optical fibers of the one input end proximate to the IP 2 is sequentially inserted and arranged into a pair of upper and lower support bodies having a long groove corresponding to a scan width of the IP 2 (S110).

In order to fix the plurality of optical fibers as a bundle 13a having a line end between the pair of upper and lower support bodies, thermal curable resin, for example, epoxy resin may be applied surrounding the plurality of optical fibers into the groove of the same (S120).

The bundle 13a of the optical fibers are hold by a forming jig, moved into a heat chamber, released by the forming jig, and thermally cured so as to have a desired shape corresponding to the support body connected to the light detector 15 (S130).

According to the present alternative method, the plurality of optical fibers of the other existence end far away from the IP 2 is sequentially inserted and arranged into a pair of upper and lower support bodies having a long groove corresponding to a scan width of the IP 2 (S140).

In order to half-fix the plurality of optical fibers as a bundle 13a having a flexible line end between the pair of upper and lower support bodies, thermal curable resin, for example, epoxy resin may be applied surrounding the plurality of optical fibers into the groove of the same (S150).

The bundle 13a of the optical fibers are hold by a forming jig, moved into a heat chamber, released by the forming jig, and thermally half-cured at the lower temperature than the cure temperature thereof so as to fold the flexible line end with a plurality of sub-bundles in a desired shape corresponding to the support body connected to the light detector 15 (S160).

And, the flexible liner end may be folded along one direction at nth row and then folded along the opposite direction at n+1th row so as to have a plurality of sub-bundles in a desired shape corresponding to the support body connected to the light detector 15 (S170). Accordingly, the plurality of optical fibers of the other existence end far away from the IP 2 are arranged in order along one direction at nth row and then in order along the reverse direction at n+1th row in a hole of a support body connected to the light detector 15.

The bundle 13a of the optical fibers are hold by a forming jig, moved into a heat chamber, released by the forming jig, and entirely thermally cured so as to have a desired shape corresponding to the support body connected to the light detector 15 (S180).

According to the present alternative method of FIG. 7, the plurality of optical fibers may easily have the other output end as a bundle in which the plurality of optical fiber are arranged in a zigzag pattern, having a desired two dimensional shape by preparing a flexible liner thermal curable resin-bag, inserting and arranging the plurality of optical fibers in order in the flexible liner thermal curable resin-bag, folding the flexible liner thermal curable resin-bag having the order-arranged optical fibers as a plurality of sub-bundles in a hole of the desired two dimensional shape and then finally thermally curing the same.

Accordingly, the plurality of optical fibers of the other existence end far away from the IP 2 may be arranged in order along one direction at nth sub-bundle of nth row and then in order along the reverse direction at n+1th sub-bundle of n+1th row in a hole of a support body connected to the light detector 15.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A computed radiography system, comprising a stimulating light source, an imaging plate (IP) positioned such that the stimulating light impinges the IP perpendicularly thereto producing photostimulated luminescence light (PLL) having a wavelength different from said stimulating light source, a light collector having a bundle of optical fibers for collecting and transferring PLL emitted from the IP, the bundle providing with a linear end proximate to the IP and a two-dimensional end far away from the IP in which a plurality of optical fibers are arranged according to a constant rule, an optical filter in communication with said light collector for blocking stimulating light waves and passing PLL therethrough, a light detector for receiving PLL from the two-dimensional end of the bundle of the light collector, a mechanism providing relative movement in two orthogonal directions between the IP and the stimulating light source while maintaining the perpendicular relationship between the IP and the stimulating light, and a mechanism including an analog to digital converter for converting the collected and detected PLL to a diagnostic readout,
wherein a two dimensional shaped output portion includes the plurality of optical fibers advanced in a zigzag pattern along one direction of a predetermined two dimensional shape.

2. The computed radiography (CR) system of claim 1, wherein the constant rule is that a n+1th optical fiber is disposed proximately to a nth optical fiber at the output end from which the PLL outputs.

3. The computed radiography (CR) system of claim 2, wherein the plurality of optical fibers are arranged in order along one direction at a nth row and then arranged in order along the opposite direction at a n+1 th row so as to form the two dimensional shaped output portion.

4. The computed radiography (CR) system of claim 2, wherein the two dimensional shaped output portion has one shape selected from a group of circular, square, and hexagon.

5. The computed radiography (CR) system of claim 4, wherein the two dimensional shaped output portion is a hexagon.

6. The computed radiography (CR) system of claim 4, wherein the two dimensional shaped output portion is a square.

* * * * *